United States Patent [19]
Vandenberg

[11] Patent Number: 5,234,329
[45] Date of Patent: Aug. 10, 1993

[54] ANGLE PIN ASSEMBLY

[76] Inventor: Leo A. Vandenberg, 1032 Heartwood La., Lake Zurich, Ill. 60047

[21] Appl. No.: 956,098

[22] Filed: Oct. 2, 1992

[51] Int. Cl.$^5$ .................. B29C 45/33; B29C 45/44
[52] U.S. Cl. .................. 425/186; 249/63; 249/66.1; 425/192 R; 425/441; 425/577; 425/DIG. 58
[58] Field of Search .......... 425/186, 192 R, 195, 425/577, 468, DIG. 10, DIG. 58, 441, 443; 249/63, 64, 142, 177, 161, 178, 66.1

[56] References Cited

U.S. PATENT DOCUMENTS

| | | | |
|---|---|---|---|
| 4,125,246 | 11/1978 | von Holdt | 425/441 |
| 4,362,291 | 12/1982 | Fuke et al. | 249/63 |
| 4,502,660 | 3/1985 | Luther et al. | 249/63 |
| 4,717,113 | 1/1988 | Martin | 249/63 |
| 4,765,585 | 8/1988 | Wieder | 249/64 |
| 4,768,747 | 9/1988 | Williams et al. | 249/63 |
| 4,828,480 | 5/1989 | Smith | 425/562 |
| 4,923,388 | 5/1990 | Nakamuka | 425/577 |

FOREIGN PATENT DOCUMENTS

| | | | |
|---|---|---|---|
| 621698 | 6/1961 | Canada | 249/63 |
| 62-240522 | 10/1987 | Japan | 425/577 |

*Primary Examiner*—Khanh P. Nguyen
*Attorney, Agent, or Firm*—Henderson & Sturm

[57] ABSTRACT

An angle pin assembly for use in an injection mold having a cam slide. The angle pin assembly includes a bushing and an angle pin. The bushing is received in a bore that is made perpendicular to the planar surface of a cavity retaining plate. This perpendicular bore can be made using a CNC machine so that all machining can be completed on a single machine. The bushing includes an angled bore for receiving an angle pin. The angled bore in the bushing is aligned with an angled pin receiving opening in the cam slide so that normal movement of the mold when opening and closing results in lateral movement of the cam slide away from and toward the molded part.

6 Claims, 1 Drawing Sheet

ANGLE PIN ASSEMBLY

TECHNICAL FIELD

This invention relates to injection molding apparatus, and more particularly to an angle pin assembly used in an injection mold.

BACKGROUND ART

In injection molds, mating plates abut at a parting line to form an interior molding cavity. Frequently molded part details require additional movable cone pieces that must move in a plane disposed at ninety degrees to the movement of the plates as the mold is opened and closed. The cone pieces are attached to a cam slide which is moved by an angle pin. The angle pin is received in an angled bore extending through the cavity retaining plate and a corresponding angled opening in the cam slide. In the normal opening movement of the mold, the angle pin forces the slide laterally away from the molded piece on a guided path so the part can be removed from the molding cavity.

Molds using angle pins are currently made by machining an angled bore through the cavity retaining plate with a special machine such as a drill press. These special machines are used very little now since computer numerical control (CNC) machines are used for most, if not all, drilling and milling operations. However, CNC machines are large, rigid, and not well suited for drilling angled bores in mold plates. The heavy plates, thus, must be moved to another machine to be drilled. This procedure is impractical since it requires a separate setup which increases the expense and causes inconvenience.

Those concerned with these and other problems recognize the need for an improved angle pin assembly.

DISCLOSURE OF THE INVENTION

The present invention provides an angle pin assembly for use in an injection mold having a cam slide. The angle pin assembly includes a bushing and an angle pin. The bushing is received in a bore that is made perpendicular to the planar surface of a cavity retaining plate. This perpendicular bore can be made using a CNC machine so that all machining can be completed on a single machine. The bushing includes an angled bore for receiving an angle pin. The angled bore in the bushing is aligned with an angled pin receiving opening in the cam slide so that normal movement of the mold when opening and closing results in lateral movement of the cam slide away from and toward the molded part.

An object of the present invention is the provision of an improved angle pin assembly.

Another object is to provide an angle pin assembly that can be inserted into a right angled opening in a mold cavity retaining plate.

A further object of the invention is the provision of an angle pin assembly that is inexpensive to manufacture.

Still another object is to provide an angle pin assembly that is convenient to use.

A still further object of the present invention is the provision of an angle pin assembly that eliminates the need of machining angled openings in heavy mold plates.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
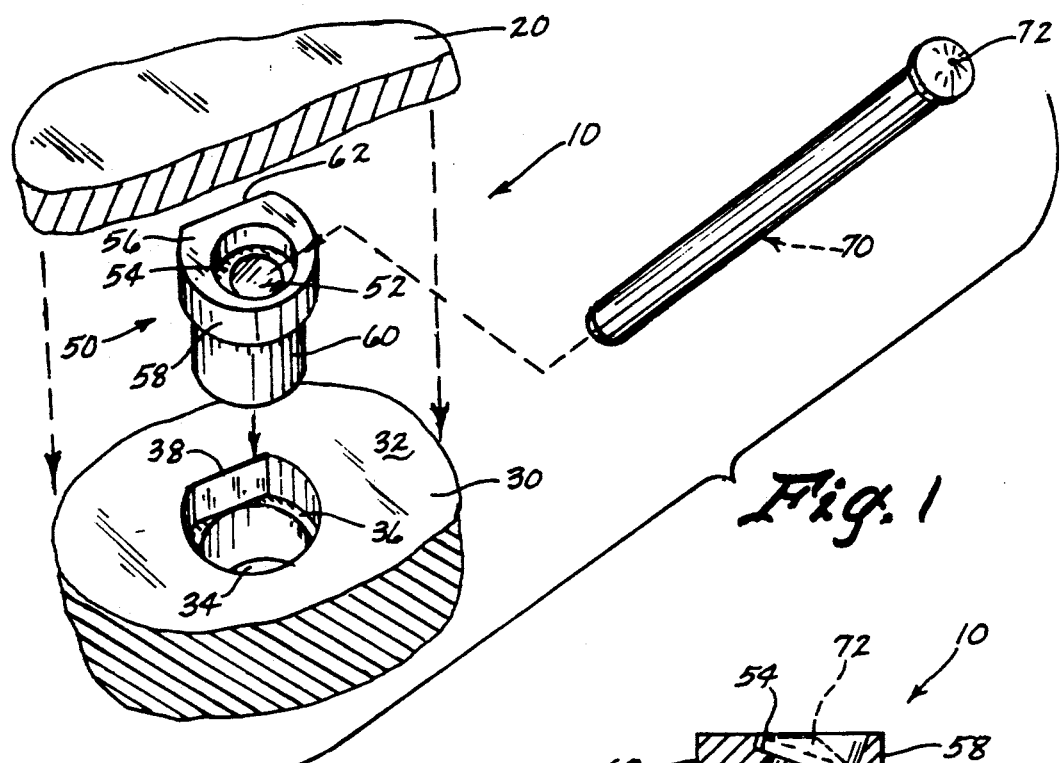
FIG. 1 is an exploded perspective view showing the angle pin assembly in relation to the exterior plate and cavity retaining plate of an injection mold.

Referring now to the drawings, wherein like reference numerals designate identical or corresponding parts throughout the several views, FIG. 1 shows the angle pin assembly (10) of the present invention as it is positioned between the exterior plate (20) and the cavity retaining plate (30) of a conventional injection mold. The cavity retaining plate (30) has an upper planar surface (32) and an opening (34) that extends through the retaining plate (30) perpendicular to the surface (32). A counterbore forms a shoulder (36) below the surface and a flat key section (38) is formed on one side of the counterbore.

Figure 2:
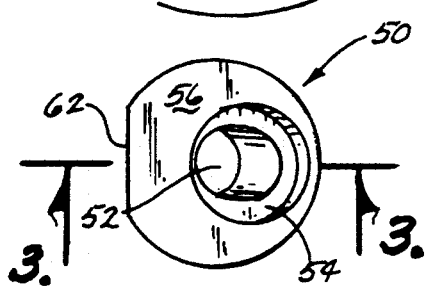
FIG. 2 is a top plan view showing the bushing of the angle pin assembly having the angled bore and a flat key section.
Figure 3:
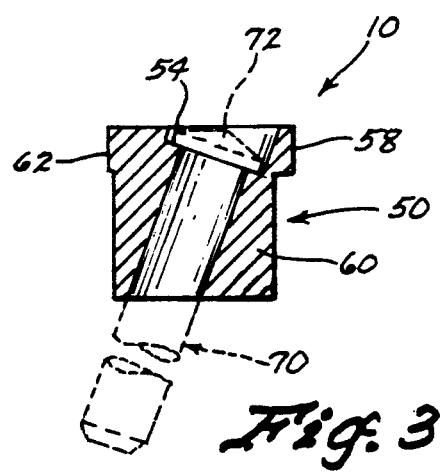
FIG. 3 is a side elevation sectional view showing the bushing with the angular bore and an angle pin shown in dashed lines.

Referring now to FIGS. 2 and 3, the angle pin assembly includes a bushing (50) and an angle pin (70) that is received in an angled bore (52) extending through the bushing (50). A counterbore forms a shoulder (54) near the top surface (56) of the bushing (50). An enlarged lip section (58) extends out from the top of the body section (60) of the bushing (50) and a flat key section (62) is formed on one side of the lip section (58). When fully inserted into the angled bore (52), the enlarged head (72) of the angle pin (70) rests on the shoulder (54) of the bushing (50).

Figure 4:
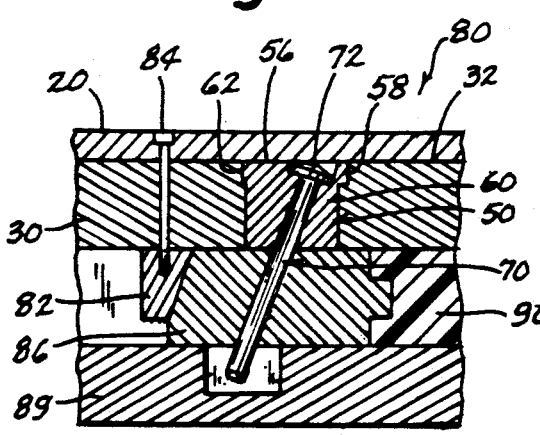
FIG. 4 is a partial side elevation sectional view showing the angle pin assembly in a closed mold where the bushing is received in the cavity retaining plate and the angle pin is received in the angular bore of the bushing and the angular pin receiving opening in the cam slide.
Figure 5:
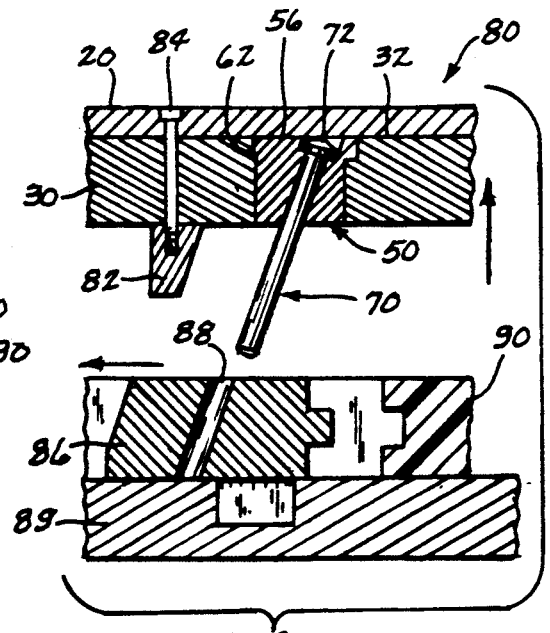
FIG. 5 is a partial side elevation sectional view showing the angle pin assembly in an open mold where the angle pin is retracted from the angular pin receiving opening in the cam slide causing the cam slide to move out from the molded part.

As best shown in FIGS. 4 and 5, the angle pin assembly (10) is used in a mold (80) that includes a heel block (82) secured by bolt (84) to the retaining plate (30). When assembled (FIG. 4), the heel block (82) contacts the outer section of the cam slide (86) and the angle pin (70) is received in an angled pin receiving opening (88) forcing the cam slide (86) to move along the core retaining plate (89) into engagement with the molded part (90). As shown in FIG. 5, when the mold (80) is opened the motion of the angle pin (70) forces the cam slide (86) out from engagement with the molded part (90).

To use the angle pin assembly (10), the opening (34) is formed in the retaining plate (30) and the bushing (50) is inserted so that the flat key section (62) of the bushing (50) matingly engages the flat key section (38) in the counterbore. This radially aligns the bushing (50) so that its angled bore (52) aligns with the angled pin receiving opening (88) in the cam slide (86). Engagement of the lip section (58) of the bushing (50) with the shoulder (36) axially aligns the bushing (50) with respect to the plate (30) so that the top surface (56) of the bushing (50) is aligned with the top surface (32) of the plate (30).

The angle pin assembly (10) of the present invention may be constructed of various suitable materials and made in various dimensions to suit all applications.

Thus, it can be seen that at least all of the stated objectives have been achieved.

Obviously many modifications and variations of the present invention are possible in light of the above teachings. It is therefore to be understood that, within the scope of the appended claims, the invention may be practiced otherwise than as specifically described.

I claim:

1. In an injection mold including a cam slide having an angled pin receiving opening and a cavity retaining plate having a planar surface provided with a stepped shoulder opening having a longitudinal axis disposed perpendicular to the planar surface, an improvement comprising an angle pin assembly including:

a bushing dimensioned to be received in the stepped shoulder opening of said cavity plate, and including an angled bore forming an angle with said longitudinal axis and extending through said bushing;

an angle pin disposed to be received in and to extend through the angled bore in the bushing to selectively engage the angled pin receiving opening in the cam slide, whereby the cam slide is selectively moved outward and inward as the mold is opened and closed; and, means for radially aligning the bushing with respect to the plate such that the angled bore in the bushing aligns with the angled pin receiving opening in the cam slide.

2. The improvement of claim 1 wherein the radial alignment means includes a flat key section formed in the stepped shoulder opening and a mating flat key section formed on the bushing.

3. The improvement of claim 1 further including:

means for securing the angle pin against downward axial movement in the angled bore of the bushing.

4. The improvement of claim 3 wherein the securing means includes a shoulder section formed in the angled bore of the bushing and a mating head portion formed on one end of the angle pin.

5. The improvement of claim 1 further including:

means for axially aligning the bushing with respect to the plate such that a top surface of the bushing is disposed co-planar with the planar surface of the plate.

6. The improvement of claim 5 wherein the axial alignment means includes a shoulder section formed in the stepped shoulder opening of said plate and a mating lip section formed on the exterior of said bushing.

* * * * *